United States Patent [19]

Borisov et al.

[11] 3,805,029

[45] Apr. 16, 1974

[54] DIGITAL COUNTER

[76] Inventors: Konstantin Grigorievich Borisov, Zapacny, 3, korp. 2, kv. 21; Vitaly Stepanovich Kuzemko, Trudovykh Rezervov, 56g, kv. 12; Leonid Semenovich Sitnikov, Trodovykh Rezervov, 56g, kv. 22; Stepan Emelyanovich Tokovenko, Zapadny, 3, korp. 1, kv. 59; Lev Lazarevich Utyakov, Zapadny, 3, korp. 2, kv. 90, all of Kiev, U.S.S.R.

[22] Filed: Mar. 23, 1972

[21] Appl. No.: 237,323

Related U.S. Application Data

[63] Continuation of Ser. No. 879,416, Nov. 24, 1969, abandoned.

[52] U.S. Cl. ........ 235/92 EA, 235/92 CC, 235/92 R

[51] Int. Cl. .......................................... H03k 21/18

[58] Field of Search ................... 235/92 EA, 92 CC; 315/84.5, 84.6

[56] References Cited

UNITED STATES PATENTS 3,566,089 2/1971 Yokoyama et al. ............ 235/92 EA 3,392,270 7/1968 Boucke.......................... 235/92 EA

*Primary Examiner*—Paul J. Henon

*Assistant Examiner*—Joseph M. Thesz, Jr.

*Attorney, Agent, or Firm*—Waters, Raditi & Schwartz

[57] ABSTRACT

A digital counter providing indication of the results of the counting, including a multicolumn counter with indicators having like digital electrodes which are combined and controlled by a reference pulse generator with ten outputs, such as with a decimal counter. Each decimal column of the displayed counter includes its own converter for a binary decimal code into a pulse position code whose output is connected through an amplifier to a common electrode, such as the anode of the digital indicator. Counting indication is obtained on the parallel principle simultaneously in all the columns, the indicators being actuated when the pulses on the digital and common electrodes coincide.

3 Claims, 6 Drawing Figures

DIGITAL COUNTER

This application is a continuation application of Ser. No. 879,416, filed Nov. 24, 1969 now abandoned.

The present invention relates in general to digital counters and can be used in automatics, computer and digital instrumentation.

Known are digital counters, for example, those described in U.S. Pat. No. 3,566,089 in which binary-decimal to decimal pulse-position conversion by complement is used for information retrieval.

These devices operate in two modes: counting and display. The display function is ensured by entering a train of 10 inspection pulses into each decade and breaking the couplings between decades, that is in this case the carry pulse is inhibited. The inhibited carry pulse is used to operate a switch in the anode of a number tube. At the same time, the inspection pulses close each cathode switch in turn. The switches close in complementary order — cathode for switch 9 closes on the first pulse, 8 on the second pulse, and so on. When both the anode and a particular cathode switches are simultaneously closed, the tube displays a character — that of the number stored in the driving decimal counter.

Also known is a frequency meter which incorporates a dynamic search device with a pulse-position data representation. Ramp generators used in this apparatus perform the functions of pulse-position multistable elements. The apparatus operates in the same manner as the above-described one except that the information from the output of the flip-flop decade, which the train of 10 inspection pulses is fed to its input, is stored in clock ramp generators. Each of these generators counts then up to 10 and is reset after the cathode corresponding to the stored number is gated. After the stored information is discounted the output of the ramp generator is applied through a former-amplifier to the anode of a particular indicator tube which displays the stored number.

The described apparatuses have separate counting and display functions and require breakage of couplings between decades in the display mode.

These disadvantages prevent the foregoing apparatuses from being used in the systems where a continuous counting display is required, for example, in digital integrating devices, in time counters, etc.

An object of the present invention is to provide a digital counter with dynamic information retrieval, in which combined counting and display modes offer wide functional possibilities.

With these and other objects in view the present invention resides in a digital counter incorporating displayed decades, a master timer driving a reference pulse train generator, as for instance, a trigger deacde having a first group of outputs hereinafter called 'position outputs' numbering 10, which output pulses are digital constants "0," "1," "2," . . . "8," "9" in pulse position code, and a second group of outputs hereinafter referred to as 'code outputs' numbering four, which output pulses are digital constants of "0,""1," "2," . . . "8," "9" in binary decimal code, each output of which is coupled with like digital electrodes of digital indicators and/or with electromagnets of a digital printer, in which, according to the present invention, the output of each displayed decade is connected to an individual binary-decimal to decimal pulse-position converter which is driven by said reference pulse train generator, the output of said converter being linked via a pulse former with the common electrode of a particular digital indicator and/or with electromagnets of said digital printer.

According to one possible form of the present invention, each binary-decimal to decimal pulse-position converter can incorporate logic conjunctive gates and a disjunctive gate, the first inputs of all the conjunctive gates being connected the outputs of the first group of outputs of the reference pulse train generator and the other inputs to the outputs of the displayed decade in accordance with the code of decade operation, and the outputs of these gates being connected with the inputs of the disjunctive gate, the output of which is at the same time the output of the converter.

According to another form of the invention, each binary-decimal to decimal pulse-position converter can include logic material equivalence circuits and a conjunctive gate, the first inputs of said material equivalence circuits being connected to the code outputs of the second group of outputs of the reference pulse train generator and its second input, to the corresponding output of the displayed decade, and the outputs of these circuits being connected to the conjunctive gate input whose output is at the same time the output of the converter.

Each binary-decimal to decimal pulse-position converter may include a first digital-analog converter, which is common to all the binary-decimal to decimal pulse-position converters, a second digital-analog converter, and a voltage comparator circuit, the inputs of the first digital-analog converter being connected to the outputs of the second group of the outputs of a reference pulse train generator, the inputs of the second digital-analog converter being connected to the outputs of the corresponding decade, the outputs of the both digital-analog converters being connected to the inputs of the voltage comparator circuit, while the comparator circuit output is at the same time the output of the binary-decimal to decimal pulse-position converter.

Other objects and advantages of the invention will hereinafter become more fully apparent from the following description of the annexed drawings which illustrate preferred embodiments and wherein.

Figure 1:
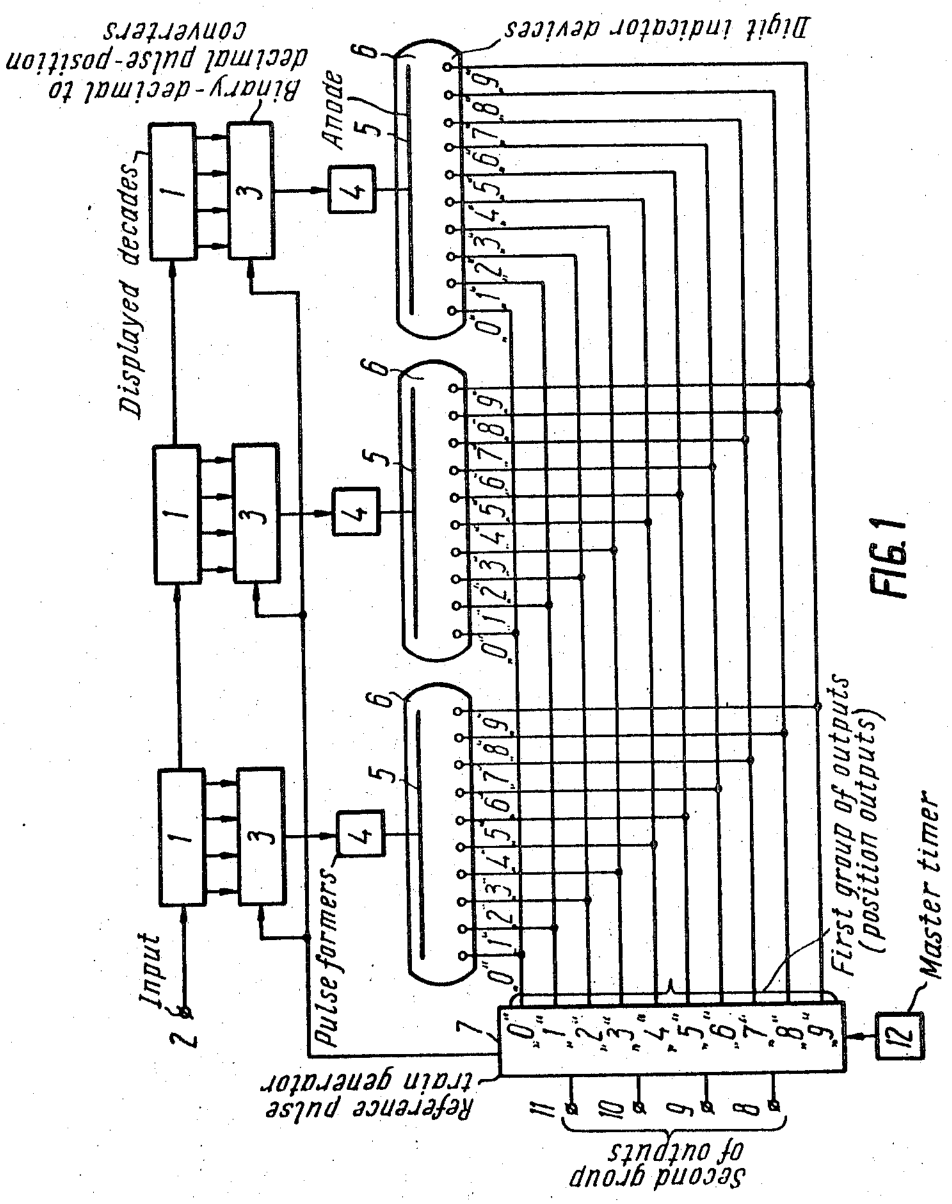
FIG. 1 is a block diagram of a digital counter embodying the invention.

The digital counter provided by the invention as seen from the block diagram shown in FIG. 1 comprises decades 1, and an input 2 of the lowest order decade is fed with a pulse sequence. A binary-decimal to decimal pulse-position converter 3 is connected to the flip-flop outputs of each decade, the number of outputs (four or eight) of each decade depending upon the circuitry of the converter 3 being used.

The outputs of the converters 3 are coupled via matching pulse formers 4 with the common inputs of digital indicators, that is, with anodes 5 of gas discharge tubes 6.

The converter 3 is controlled by the reference pulse train generator 7 which is an electronic commutator such as, for instance, a trigger counting decade with a first group of outputs '0,' '1,' '2,' . . . '8,' '9,' whose output pulses are digital constants '0,' '1,' '2,' . . . '8,' '9' in the phase-pulse code, the pulse at each successive output lagging one period relative to the pulses from the preceding output, and a second group of outputs 8, 9, 10, 11, whose output signals are digital constants '0,' '1,' '2,' . . . '8,' '9' in the binary-decimal code.

Like electrodes "0," "1," "2," "3," . . ., "8," "9" of all digital indicators 6 are grouped together and connected to the corresponding position outputs "0," "1," "2," "3," . . ., "8," "9" of the reference pulse train generator 7.

The converter 3 incorporates logic conjunctive gates 13 and a disjunctive gate 14. One input of each gate 13 is coupled with the corresponding position output of the reference pulse train generator 7 and its other inputs are connected to the corresponding outputs of the decade 1 depending upon the code which is going through the decade. The outputs of the gates 13 are applied through the gate 14 to the input of the pulse former 4.

Regarding FIGS. 2, 3, 4, the design of the digital counter block diagram is essentially the same as that represented in FIG. 1; consequently, hereinbelow described in more detail are only their distinctive features in a binary-decimal to decimal pulse-position converter 3.

Figure 2:
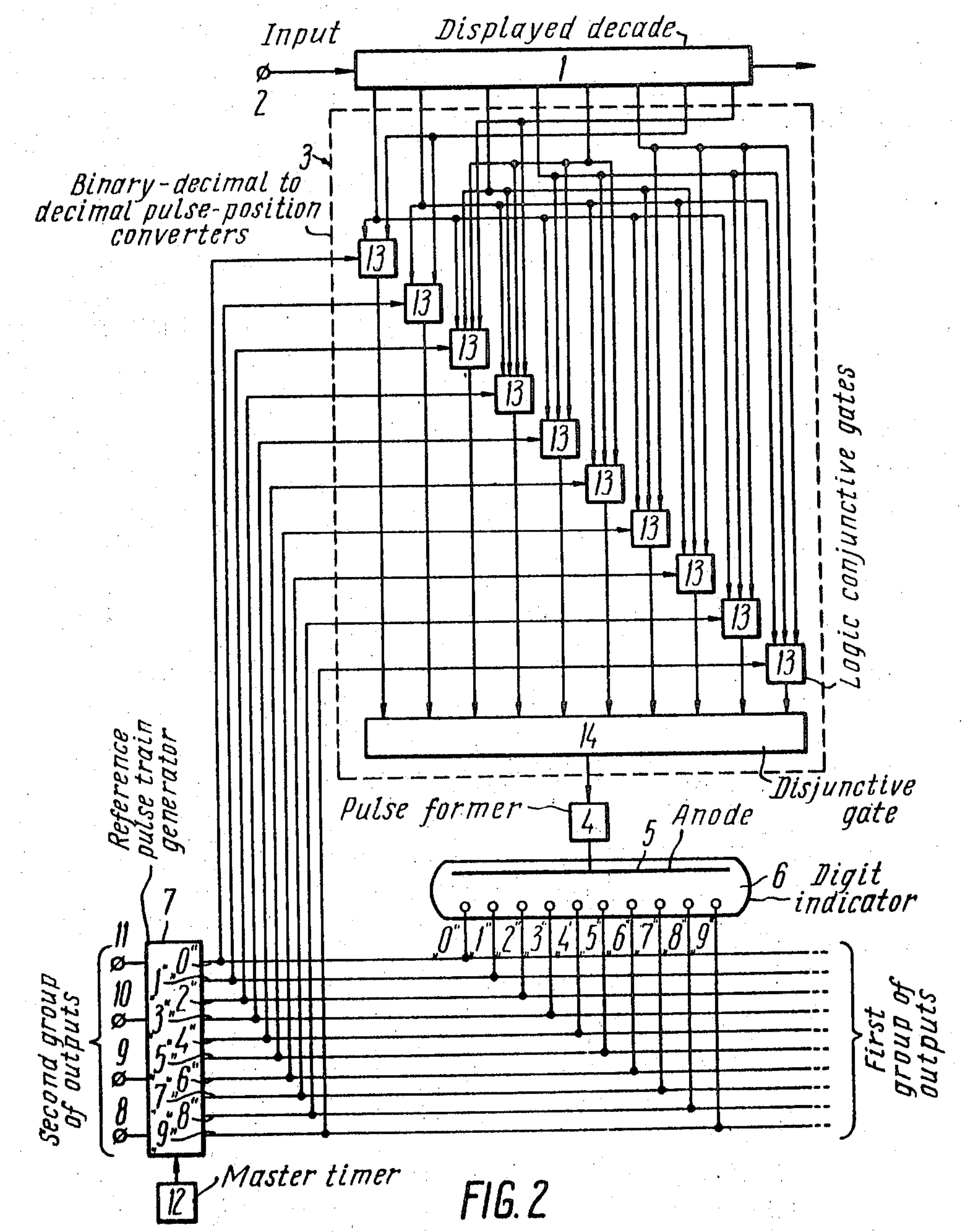
FIGS. 2, 3, 4 are block diagrams of a digital counter with different binary-decimal to decimal pulse-position converters.
Figure 3:
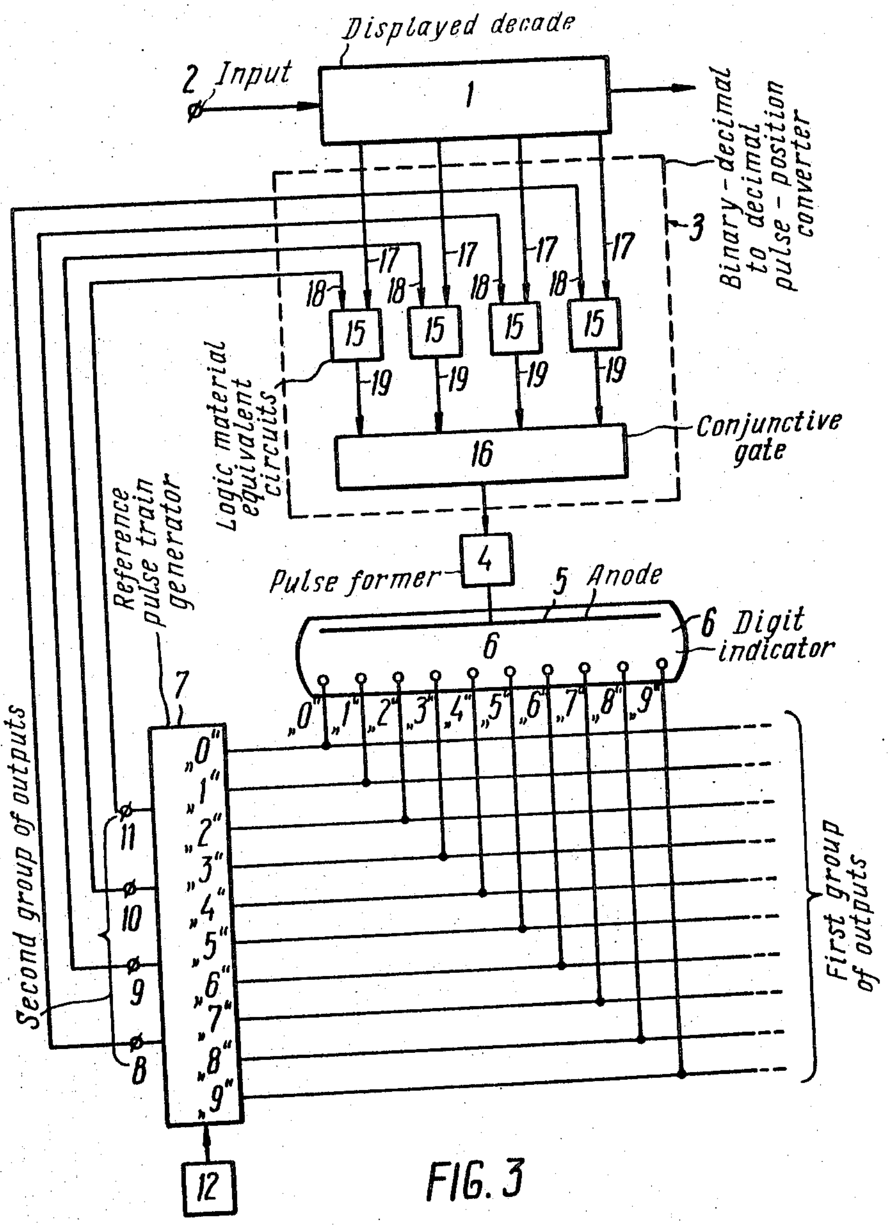

FIG. 2 illustrates another possible form of the invention, accordingly to which the converter 3 comprises a logic material equivalence circuit 15 and a conjunctive gate 16. The inputs 17 of the circuits 15 are connected to the code outputs of the decades 1 and inputs 18, to the outputs 8, 9, 10, 11 of the generator 7, the latter producing pulse-position as well as binary-coded constants. Outputs 19 of the circuits 15 are applied via the gate 16 to the input of the pulse former 4.

Figure 4:
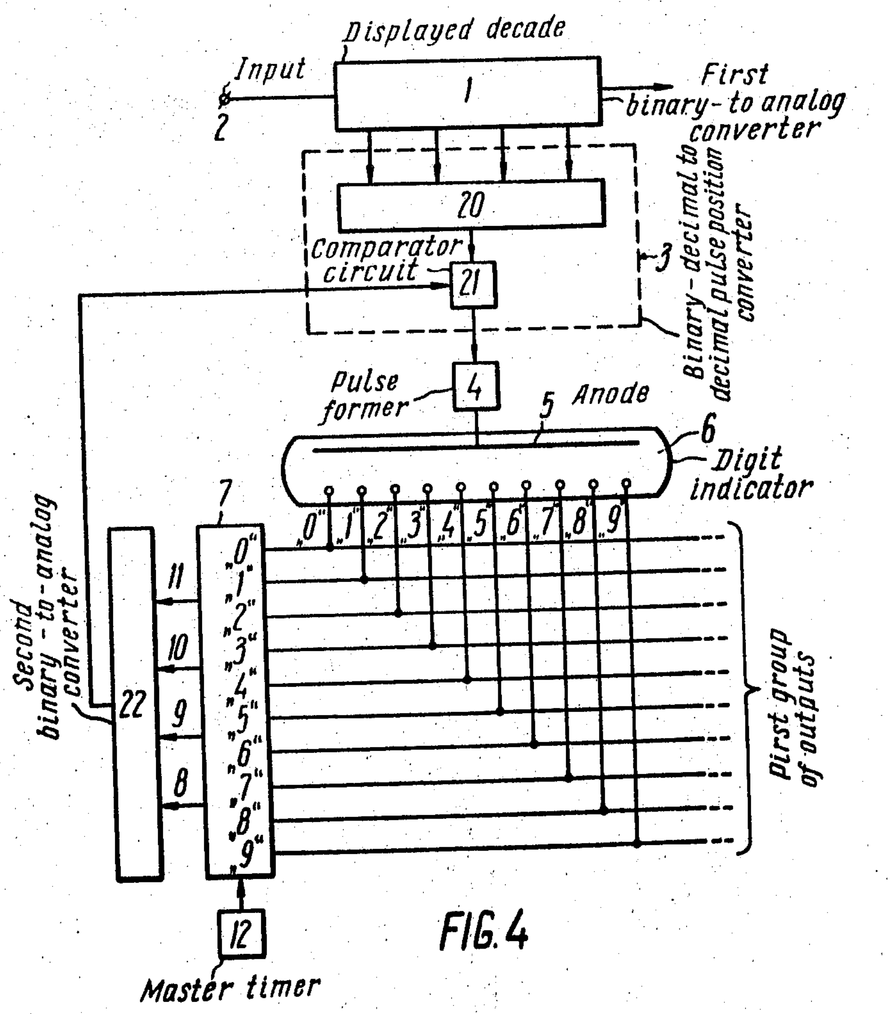

In a preferred form of the invention shown in FIG. 4, the converter 3 incorporates a digital-analog converter 20 and a voltage comparator circuit 21. The inputs of the converter 20 are coupled with the outputs of the decade 1 and its output is connected with one of the inputs of the circuit 21. The second input of the circuit 21 is connected to the output of digital-analog converter 22, the inputs of the latter being connected with the code outputs 8, 9, 10, 11 of the generator 7. The output of the circuit 21 which is the output of converter 3 is applied to the pulse former 4.

Figure 5:
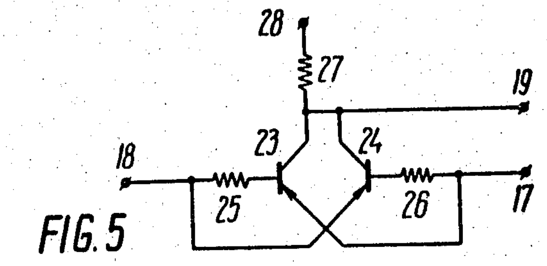
FIG. 5 is a schematic diagram of a material equivalence circuit embodying the invention, and FIGS. 6*a, b, c, d, e, f, g, h, i, j, k, l, m, n* are graphs illustrating the basic pricniple of a digital counter embodying the invention.

FIG. 5 illustrates one possible form of the logic material equivalence circuit built around transistors 23 and 24. The base of each transistors is coupled via limiting resistors 25 and 26 with one of the inputs 17 and 18 of the circuit and with the emitter of the opposite transistor. The collectors of the transistors 23 and 24 are connected with the circuit output 19 and through the resistor 17 with a supply line 28.

The operation of the device shown in FIG. 1 is as follows.

Counting pulses are fed to the input 2 of the decade 1, binary-coded information from the output of each decade is supplied to the converter 3.

Figure 6:
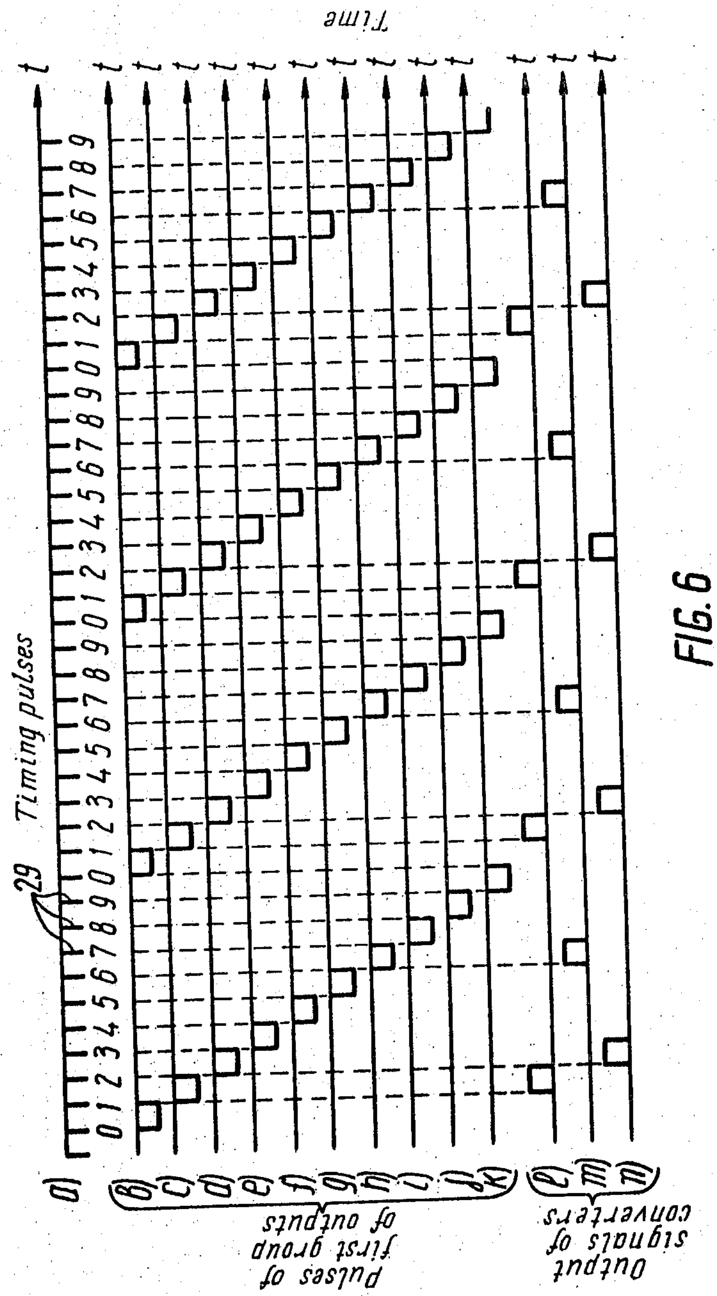

Timing pulses 29 (FIG. 6*a*) from the master timer 12 drive the generator 7 and, as a result, pulses (FIG. 6*b, c, d, e, j, k*) make their appearance at the position outputs "0," "1," "2," . . ., "8," "9" of this generator. These pulses represent numbers 1, 2, 3, . . ., 8, 9 in a pulse-position code, the pulse at each subsequent output of the generator 7 lagging for a period with respect to the pulses from the preceding output.

The converter 3 of each code compares the output signal of the corresponding position, this pulse being produced with the help of position constants which are fed to the converter 3 from the outputs of the generator 7.

The output signal (FIG. 6*l, m, n*) of the converter 3, which is indicative of the decade state at a given moment, is applied via the pulse former to the anode 5 of the indicator tube 6. At the same time the output pulses of the generator 7 (FIG. 6*b–k*) energize in turn like cathodes of all tubes 6. As the output pulses from the pulse former 4 coincide with the pulses of the generator 7 at tne of the cathodes of the indicator tube 6, a discharge is produced in the corresponding gap and the tube displays a character indicating the number stored in the decade. The pulses repetition rate at the position outputs "0," "1," "2," . . ., "8," "9" of generator 7 is 10 times lower than that of the timer 12 and it is chosen so that it exceeds the persistence of human vision.

As shown in FIG. 1, the converter 3 is a common binary-decimal to decimal pulse-position decoder, in which the number of conjunctive gates and the connection of their inputs to the outputs of a trigger displayed decade are determined by the code used by the decade. The present converter 3 is different from the known decoders in that the second inputs of all the conjunctive gates 13 are supplied, not with the potential from a common source, but with phase constants from the first group of outputs 0, 1, 2, 3, . . . 9 of the reference pulse train generator 7. The output signals of all the conjunctive gates 13 are collected by the disjunctive gate 14, as a result of which its output shows a decimal pulse position code.

The conversion of binary-decimal code to decimal pulse position code in the device illustrated in FIG. 1 is as follows.

Codes from the flip-flops of the decade 1 are applied to the inputs of each conjunctive gate 13. To each of 10 possible codes of the decade corresponds a particular gate 13 which opens as a particular code is applied thereto. Other inputs of each gate 13 are fed with the respective position constants from position outputs "0," "1," "2," . . ., "8," "9" of the generator 7. Each gate 13 opens and produces pulses only when a corresponding code is available at its input. For example, code 0000 determines the open state of a particular gate 13 whose input is fed with position constant 0, and code 1000 opens that gate 13 at which input is available position constant 1.

Thus, as one of the 10 possible codes is applied to the inputs of the converter 3, the corresponding position constants make their appearance at its output.

The converter 3 shown in FIG. 2 is a device used for comparing codes. The necessary condition ensuring a correct operation of the converter 3 is an identical-code operation mode of the displayed decade 1 and of the trigger counting decade of the reference pulse train generator 7. The logic material equivalence circuits 15 are devices, at whose output a single signal appears when their inputs are supplied with identical signals 0 or 1. Accordingly, the output 19 of the logical material equivalence circuit in the present apparatus shows a negative potential corresponding to a single signal only when the potentials at the inputs 17 and 18 are equal, which corresponds to the identical siganls 0 or 1.

The converter 3 (FIG. 3) has four such equivalence circuits, sufficient to compare the codes from the outputs of the decade 1 and from the outputs 8, 9, 10 and 11 of the generator 7. At the moment when the codes fully coincide the outputs 19 of all the four logical material equivalence circuits produce a signal causing operation of the four-input conjunctive gate 16.

The converter 3 (FIG. 3) operates as follows. Code combinations arrive from the displayed decade 1 at the inputs 17 of the equivalence circuit 15. Since code combinations corresponding to the digits 0, 1, 2, 3. . . 9 appear successively in time at the outputs 8, 9, 10 and 11 of the generator, the codes coincide after each ten pulses of the master timer 12. The four-input conjunctive circuit 16 operates each time when the codes coincide, and the signal position at its output contains information on the condition of the decade. The signal from th output of the conjunctive gate 16 is amplified by the former 4 and supplied to the anode of the tube 6.

Since this signal coincides in time at one of the position outputs connected to the digital cathodes of the tube 6, each time the codes coincide a digit reflecting the contents of the displayed decade 1 will light up.

A negative potential at the output 19 of the logic material equivalence circuit shown in FIG. 5 appears only in case of potential equality at the inputs 17 and 18. If these potentials at the inputs 17 and 18 are unequal one of the transistors 23, 24 opens and no signal appears at the output 19.

It is clear that the above-described circuit can also be used with such codes whose coincidence results in zero potential at the outputs 19. In this case a disjunctive gate with an inverter must be used instead of the conunctive gate.

In a preferred form of the invention shown in FIG. 4, a binary-decimal code from the output of the decade 1 is delivered to the digital-analog converter 20 which produces a particular voltage corresponding to each code. This voltage is applied to one of the inputs of the voltage comparator circuit 21. The second input of this circuit is fed with staircase voltage from the other digital-analog converter 22 connected to the code outputs 8, 9, 10, 11 of the generator 7.

A sequence of binary-decimal codes appearing at the code outputs 8, 9, 10, 11 of the generator 7, corresponding to numbers 1, 2, 3, . . ., 8, 9 is transformed by converter 22 into staircase voltages (in amplitude constants). As a result of the voltage comparison, pulses are produced at the output of the circuit 21, the position of these pulses being representative of the information stored in the decade.

From the output of the voltage comparator circuit 21 a signal via the pulse former 4 arrives to the anode 5 of the gas-discharge tube 6. Since said signal coincides in time with one of the signals emitted by the reference pulse train 7 and arriving at the digital cathodes of the gas-discharge tube 6, at each coincidence of the voltages on the inputs of the comparator circuit 21 the gas-discharge tube 6 indicates a numeral corresponding to the information stored in the decade 1.

The digital counter provided by the invention combines counting and display modes, which dilates its possible applications, for example, as an integrating counter, a time counter, etc.

Besides, the dynamic drive of the indicator tubes simplifies the counter design as only one high-voltage pulse former is used instead of 10 used for a more conventional system and a less sophisticated code converter in place of a decoder.

The present invention has been employed in developing such instruments as a multipurpose pulse counter, a digital frequency meter, an integrating voltmeter, an electronic clock, etc. These devices have remarkable advantages in overall dimensions, weight, cost power consumption and reliability over more conventional systems.

The present invention holds much promise when employing integrated circuits.

The information stored in the integrated circuit flip-flop decade of the present invention can be retrieved from only four and in some cases even from one input, which greatly simplifies the decoder circuitry.

Although the present invention has been described with respect to a particular embodiment thereof, it is not to be so limited as changes and modifications may be made therein which will be readily apparent to one skilled in the art to which the invention pertains and which are within the full intended scope of the invention as defined by the appended claims.

What is claimed is:

1. A digital counter incorporating a plurality of decades to be indexed, each of which has eight outputs of counter triggers, and a digital indicator device comprising, in combination, a source of timing pulses; a reference pulse train generator controlled by said timing pulses source and embodied as a flip-flop counter decade having the number of the first group of outputs amounting to ten, the pulses at the outputs of said first group of the outputs being numerical constants represented by a series 0, 1, 2, . . . 8, 9 according to a pulse-position code, and the number of the second group of outputs amounting to four, the pulses at the outputs of said second group of the outputs being numerical constants represented by a series 0, 1, 2, . . . 8, 9 according to a binary-decimal code; binary-decimal to decimal pulse-position converters, the number of which equals that of said decades to be indexed, each of said converters incorporating conjunctive logical circuits to the number of 10 and a disjunctive circuit having 10 inputs and one output, the inputs of said logical conjunctive circuits being connected both to the respective outputs of said first group of the outputs and to the respective outputs of the triggers in accordance with the operation code of a decade included into said decades to be indexed, whilst the outputs of said conjunctive circuits being connected to said inputs of said disjunctive circuit, said output of said disjunctive circuit simultaneously functioning as the output of said binary-decimal to decimal pulse-position converter; pulse formers, each of which is connected to the output of its respective converter included in the number of said binary-decimal to decimal pulse-position converters; gas-discharge tubes, each of which has a common electrode, for example anode, and a plurality of digital electrodes, said common electrode of each said gas-discharge tube is connected to the output of its pulse former included in the number of said pulse formers, said digital electrodes of each of said gas-discharge tubes being connected to the respective outputs of said first group of outputs.

2. In a digital counter incorporating a plurality of decades to be indexed and a digital indicator device comprising, in combination, a source of timing pulses; a reference pulse train generator controlled by said timing pulses and embodied as a flip-flop counter decade having the number of a first group of outputs amounting to 10, the pulses at the outputs of said first group of the outputs being numerical constants represented by a series 0, 1, 2, . . . 8, 9 according to a pulse-position code, and the number of the second group of the outputs amounting to four, the pulses at the outputs of said second group of the outputs being numerical constants represented by a series 0, 1, 2, . . . 8, 9 according to a binary-decimal code; binary-decimal to decimal pulse-position converters, the number of which equals that of said decades to be indexed, each of said converters incorporating material equivalence circuits, each of said equivalence circuits having two inputs and an output, the first input of said two inputs of said equivalence circuits being connected to respective outputs of said second group of the outputs of said reference pulse train generator, the second input of said two inputs being connected to the respective output of a decade included in the number of said decades to be indexed, and a conjunctive circuit whose inputs are connected to the outputs of said material equivalence circuits, while the output simultaneously functions as the output of said converter; pulse formers, each of which is connected to the output of its respective converter included in the number of said converters; gas-discharge tubes, each having a common electrode, for example anode, and a plurality of digital electrodes, said common electrode of each of said gas-discharge tubes being connected to the output of its respective pulse former included in the number of said pulse formers, each of said digital electrodes of each of said gas-discharge tubes being connected to its respective outputs of said first group of the outputs.

3. In a digital counter incorporating a plurality of decades to be indexed and a digital indicator device comprising, in combination, a source of timing pulses; a reference pulse train generator controlled by said timing pulses and embodied as a flip-flop counter decade having the number of the first group of outputs amounting to 10, the pulses at the outputs of said first group of the outputs being numerical constants represented by a series 0, 1, 2, . . . 8, 9 according to a pulse-position code, and the number of the second group of the outputs amounting to four, the pulses at the outputs of said second group of the outputs being numerical constants represented by a series 0, 1, 2, . . . 8, 9 according to a binary-decimal code, and incorporating a first binary-analog converter whose inputs are connected to the outputs of said second group of the outputs; binary-decimal to decimal pulse-position converters, the number of which equals that of said decades to be indexed, each of said converters incorporating a second binary-analog converter whose inputs are connected to the outputs of its respective decade included in the number of said decades to be indexed, and a comparator circuit whose first input is connected to the output of said first binary-analog converter, while its second input is connected to the output of its respective second binary-analog converter, while the output of said comparator circuit simultaneously functions as the output of said binary-decimal to decimal pulse-position converter; pulse formers, each connected to the output of its respective converter included in the number of said binary-decimal to decimal pulse-position converters; gas-discharge tubes, each having a common electrode, for example anode, and a plurality of digital electrodes, the said common electrode of each of said gas-discharge tubes being connected to the output of its respective pulse former, the said digital electrodes of each of said gas-discharge tubes being connected to its respective outputs of said first group of the outputs.

* * * * *